(12) United States Patent
Urano

(10) Patent No.: US 8,829,730 B2
(45) Date of Patent: Sep. 9, 2014

(54) WIRELESS POWER FEEDER AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 173 days.

(21) Appl. No.: 13/188,228

(22) Filed: Jul. 21, 2011

(65) Prior Publication Data

US 2012/0019076 A1    Jan. 26, 2012

(30) Foreign Application Priority Data

Jul. 22, 2010   (JP) ................................. 2010-164461
Jun. 15, 2011   (JP) ................................. 2011-133292

(51) Int. Cl.
*H04B 5/00*    (2006.01)
*H02J 5/00*    (2006.01)

(52) U.S. Cl.
CPC ............ *H04B 5/0093* (2013.01); *H04B 5/0012* (2013.01); *H02J 5/005* (2013.01); *H04B 5/0037* (2013.01)
USPC ........................................................ 307/104

(58) Field of Classification Search
CPC ........................................................ H04B 5/00
USPC ........................................................ 307/104
See application file for complete search history.

(56) References Cited

U.S. PATENT DOCUMENTS

| | | | | |
|---|---|---|---|---|
| 5,841,122 A * | 11/1998 | Kirchhoff | ...................... | 235/492 |
| 5,931,836 A * | 8/1999 | Hatta et al. | ...................... | 606/38 |
| 7,385,375 B2 * | 6/2008 | Rozman | ......................... | 323/224 |
| 7,639,514 B2 * | 12/2009 | Baarman | .......................... | 363/16 |
| 7,701,736 B2 * | 4/2010 | Yang et al. | ....................... | 363/89 |
| 7,723,929 B2 * | 5/2010 | Orr | ................................. | 315/308 |
| 8,014,173 B2 * | 9/2011 | Xu et al. | ........................... | 363/17 |
| 8,035,318 B2 * | 10/2011 | Bobel | ............................. | 315/307 |
| 8,223,508 B2 * | 7/2012 | Baarman et al. | ................. | 363/17 |
| 8,258,652 B2 * | 9/2012 | Sekino et al. | ................... | 307/104 |
| 8,278,784 B2 * | 10/2012 | Cook et al. | ...................... | 307/149 |
| 2004/0130916 A1 * | 7/2004 | Baarman | ...................... | 363/21.02 |
| 2006/0083037 A1 * | 4/2006 | Leung et al. | ..................... | 363/98 |
| 2008/0231211 A1 * | 9/2008 | Baarman et al. | .............. | 315/294 |
| 2008/0278264 A1 | 11/2008 | Karalis et al. | | |
| 2009/0015075 A1 | 1/2009 | Cook et al. | | |
| 2009/0067198 A1 * | 3/2009 | Graham et al. | .................... | 363/8 |
| 2009/0072629 A1 | 3/2009 | Cook et al. | | |
| 2009/0079268 A1 * | 3/2009 | Cook et al. | ..................... | 307/104 |

(Continued)

FOREIGN PATENT DOCUMENTS

| | | |
|---|---|---|
| JP | 2006-230032 | 8/2006 |
| JP | 2008-310963 | 12/2008 |

(Continued)

*Primary Examiner* — Adi Amrany
(74) *Attorney, Agent, or Firm* — McDermott Will & Emery LLP

(57) ABSTRACT

A resonance circuit is a circuit in which capacitors, a load, and coils are connected. AC power is fed by wireless from feeding electrodes of the capacitors to receiving electrodes thereof. The oscillator alternately turns on/off switching transistors to thereby supply AC power to the resonance circuit. An AC magnetic field generated by AC current flowing in the resonance circuit causes inductive current to flow in a detection coil. A phase detection circuit compares the phase of AC voltage generated by the oscillator and phase of the inductive current to thereby detect the phase difference between the voltage phase and current phase.

6 Claims, 11 Drawing Sheets

(56) References Cited

U.S. PATENT DOCUMENTS

| | | | |
|---|---|---|---|
| 2009/0135631 A1* | 5/2009 | Yang | 363/89 |
| 2010/0109443 A1* | 5/2010 | Cook et al. | 307/104 |
| 2011/0049997 A1* | 3/2011 | Urano | 307/104 |
| 2011/0080053 A1* | 4/2011 | Urano | 307/104 |
| 2011/0080054 A1* | 4/2011 | Urano | 307/104 |
| 2011/0101791 A1* | 5/2011 | Urano | 307/104 |
| 2011/0127846 A1* | 6/2011 | Urano | 307/104 |
| 2011/0127951 A1* | 6/2011 | Walley et al. | 320/108 |
| 2011/0222651 A1* | 9/2011 | Ogawa et al. | 378/20 |
| 2011/0227420 A1* | 9/2011 | Urano | 307/104 |
| 2011/0260548 A1* | 10/2011 | Urano | 307/104 |
| 2011/0285210 A1* | 11/2011 | Lemmens et al. | 307/104 |
| 2012/0001494 A1* | 1/2012 | Urano | 307/104 |
| 2012/0019076 A1* | 1/2012 | Urano | 307/104 |
| 2012/0043825 A1* | 2/2012 | Urano | 307/104 |
| 2012/0146424 A1* | 6/2012 | Urano | 307/104 |
| 2012/0161530 A1* | 6/2012 | Urano | 307/104 |
| 2012/0161533 A1* | 6/2012 | Urano | 307/104 |
| 2012/0161534 A1* | 6/2012 | Urano | 307/104 |
| 2012/0200150 A1* | 6/2012 | Urano | 307/9.1 |
| 2012/0200169 A1* | 8/2012 | Urano | 307/104 |
| 2012/0223585 A1* | 9/2012 | Urano | 307/104 |

FOREIGN PATENT DOCUMENTS

| | | |
|---|---|---|
| JP | 3149146 | 3/2009 |
| JP | 2009-089520 | 4/2009 |
| WO | WO 2006/022365 A1 | 3/2006 |

* cited by examiner

WIRELESS POWER FEEDER AND WIRELESS POWER TRANSMISSION SYSTEM

BACKGROUND OF THE INVENTION

1. Field of the Invention

The present invention relates to a wireless power feeder for feeding power by wireless and a wireless power transmission system.

2. Description of Related Art

A wireless power feeding technique of feeding power without use of a power cord is now attracting attention. The current wireless power feeding technique is roughly divided into three: (A) type utilizing electromagnetic induction; (B) type utilizing radio wave; and (C) type utilizing resonance phenomenon of a magnetic field. The type (C) utilizing the magnetic field resonance phenomenon is a comparatively new technique and is hereinafter referred to as "magnetic field resonance type".

The magnetic field resonance type is based on a theory published by Massachusetts Institute of Technology in 2006 (refer to Patent Document 1). In the magnetic field resonance type, a feeding coil and a receiving coil are disposed so as to face each other, and power is fed from the feeding coil to receiving coil by wireless. When the feeding coil and receiving coil magnetically resonate, high current flows in the receiving coil. By utilizing the magnetic field resonance phenomenon, high power transmission efficiency can be achieved even when the distance between the feeding coil and receiving coil is large.

In addition to the magnetic field resonance type, wireless power feeding of a type utilizing an electric field resonance phenomenon is proposed (refer to Patent Document 8). One of two electrodes constituting a capacitor is used as a feeding electrode, and the other one thereof is used as a receiving electrode. When the feeding electrode and receiving electrode are made to electrically resonate, that is, the capacitor is made to resonate, power can be fed by wireless from the feeding electrode to receiving electrode with high efficiency. Such a type is referred to as "electric field resonance type".

CITATION LIST

Patent Document

[Patent Document 1] U.S. Pat. Appln. Publication No. 2008/0278264
[Patent Document 2] Jpn. Pat. Appln. Laid-Open Publication No. 2006-230032
[Patent Document 3] International Publication Pamphlet No. WO2006/022365
[Patent Document 4] U.S. Pat. Appln. Publication No. 2009/0072629
[Patent Document 5] U.S. Pat. Appln. Publication No. 2009/0015075
[Patent Document 6] Jpn. Utility Model Pat. No. 3149146
[Patent Document 7] Jpn. Pat. Appln. Laid-Open Publication No. 2008-310963
[Patent Document 8] Jpn. Pat. Appln. Laid-Open Publication No. 2009-89520

A resonance frequency changes depending on a wireless power feeding environment. In the case of the electric field resonance type, when the distance between the feeding and receiving electrodes or the positions thereof change, the electrostatic capacitance of the capacitor changes, with the result that a resonance frequency changes. In order to achieve high efficiency wireless power feeding in the electric field resonance type, a deviation between the drive frequency of a power supply circuit and resonance frequency needs to be detected in real time.

SUMMARY

The present invention has been made in view of the above issue, and a main object thereof is to detect the phase of supplied power in wireless power feeding of the electric field resonance type.

A wireless power feeder according to the present invention includes: a power transmission side resonance unit that constitutes a part of a resonance circuit constituted by connecting a first capacitor, a second capacitor, a first coil, and a load and includes one of two electrodes constituting the first capacitor and one of two electrodes constituting the second capacitor; a first switch that controls supply of current to the transmission side resonance unit in a first direction; a second switch that controls supply of current to the transmission side resonance unit in a second direction; a power transmission control circuit that alternately turns the first and second switches conductive to make the first capacitor, second capacitor, and first coil included in the resonance circuit resonate so as to allow the first and second capacitors to each feed AC power from the one electrode to the other electrode; a second coil that generates inductive current using a magnetic field generated by the AC power; and a phase detection circuit that detects a phase difference between voltage and current phases of the AC power. The phase detection circuit detects the current phase of the AC power by measuring the phase of the inductive current flowing in the second coil.

When the drive frequency of a power supply circuit is made to coincide with the resonance frequency, the power transmission efficiency in the entire system can be enhanced. Inductive current is generated in a second coil (detection coil) by a magnetic field generated by AC power, and a current phase is measured from the inductive current, so that measurement load is not directly applied to the resonance circuit. Thus, it is possible to monitor whether a resonance state is maintained by detecting the phase difference between the voltage phase and current phase while suppressing influence on the resonance characteristics.

A path of current flowing in the first and second switches and a path of current flowing in the transmission side resonance unit may be separated by a coupling transformer, and AC power may be supplied to the transmission side resonance unit through the coupling transformer.

The wireless power feeder may further include a drive frequency tracking circuit that adjusts the drive frequency of the power transmission control circuit so as to reduce the detected phase difference to allow the drive frequency to track the resonance frequency of the resonance circuit. Since the drive frequency can be tracked by the resonance frequency, power transmission efficiency can be easily maintained at high level.

A resistor may be connected to both ends of the second coil in parallel with respect to the second coil.

The phase detection circuit may measure the current phase from a change in the voltage applied to the resistor.

The wireless power feeder may further include: a first waveform rectifier that shapes an analog waveform having the same phase as that of a current waveform of the AC power into a digital waveform; and a second waveform rectifier that shapes an analog waveform having the same phase as that of a voltage waveform of the AC power into a digital waveform. The phase detection circuit may compare the edges of two digital waveforms to detect the phase difference. The digitization makes clear the reference point used for comparing a current waveform and a voltage waveform, making it easy for the phase detection circuit to identify the phase difference.

The first and second capacitors may each be constituted by opposite circular electrodes. One of the first and second capacitors may be constituted by opposite disc-shaped electrodes, and the other one may be constituted by opposite annular-shaped electrodes. The disc-shaped electrode may be disposed on the same plane as the annular-shaped electrode and disposed inside the annular-shaped electrode.

A wireless power transmission system according to the present invention includes: a resonance circuit constituted by connecting a first capacitor, a second capacitor, a first coil, and a load; a first switch that controls supply of current to the resonance circuit in a first direction; a second switch that controls supply of current to the resonance circuit in a second direction; a power transmission control circuit that alternately turns the first and second switches conductive to make the first capacitor, second capacitor, and first coil included in the resonance circuit resonate so as to allow the first and second capacitors to each feed AC power from the one electrode to the other electrode; a second coil that generates inductive current using a magnetic field generated by the AC power; and a phase detection circuit that detects a phase difference between voltage and current phases of the AC power. The phase detection circuit detects the current phase of the AC power by measuring the phase of the inductive current flowing in the second coil.

It is to be noted that any arbitrary combination of the above-described structural components and expressions changed between a method, an apparatus, a system, etc. are all effective as and encompassed by the present embodiment.

According to the present invention, the phase of supplied power can be detected in wireless power feeding of an electric field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described below with reference to the accompanying drawings.

Figure 1:
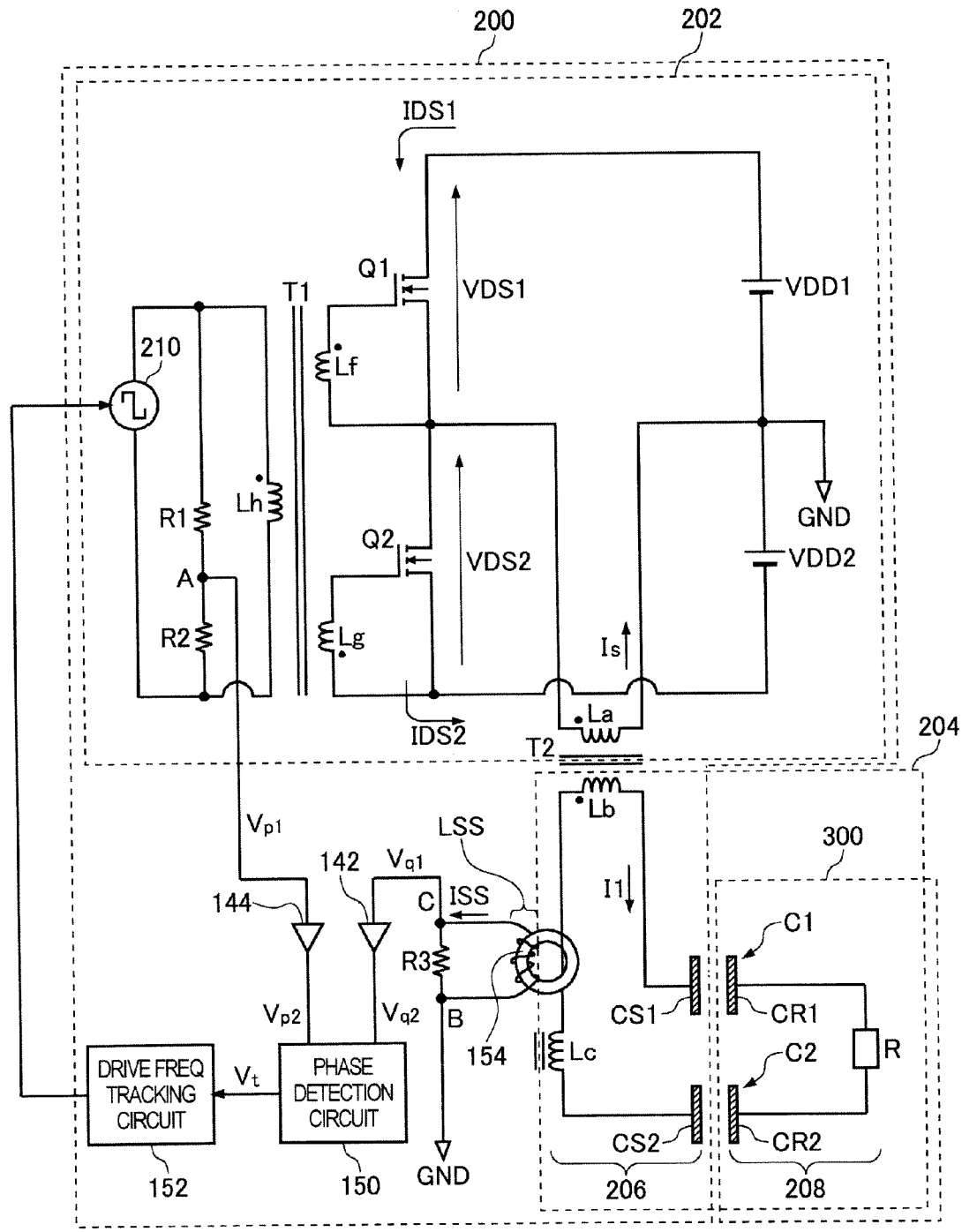
FIG. 1 is a system configuration view of a wireless power transmission system.

FIG. 1 is a system configuration view of a wireless power transmission system 100. The wireless power transmission system 100 includes, as basic components, a wireless power feeder 200 and a wireless power receiver 300. The wireless power feeder 200 includes a power supply circuit 202 and a part of a resonance circuit 204. The remaining part of the resonance circuit 204 is included in the wireless power receiver 300. The resonance circuit 204 on the wireless power feeder 200 side is referred to as a transmission side resonance unit 206, and resonance circuit 204 on the wireless power receiver 300 side is referred to as a reception side resonance unit 208.

Further, the wireless power transmission system 100 includes, for automatically adjusting a drive frequency fo, a first waveform rectifier 142, a second waveform rectifier 144, a phase detection circuit 150, and a drive frequency tracking circuit 152.

The resonance circuit 204 includes capacitors C1 and C2. The capacitors C1 and C2 are each constituted by two opposite electrodes. Of the two electrodes constituting the capacitor C1, the electrode on the transmission side resonance unit 206 side is referred to as a feeding electrode CS1, and electrode on the reception side resonance unit 208 side is referred to as a receiving electrode CR1. Similarly, of the two electrodes constituting the capacitor C2, the electrode on the transmission side resonance unit 206 side is referred to as a feeding electrode CS2, and electrode on the reception side resonance unit 208 side is referred to as a receiving electrode CR2. The transmission side resonance unit 206 and reception side resonance unit 208 in the resonance circuit 204 are physically separated from each other at the capacitors C1 and C2. The wireless power transmission system 100 mainly aims to feed power from the feeding electrodes CS1 and CS2 to the receiving electrodes CR1 and CR2 by wireless. The wireless power transmission system 100 according to the present embodiment is a system that is assumed to operate at a resonance frequency fr of about 100 kHz. Thus, the resonance frequency fr of the resonance circuit 204 is set to 100 kHz. The wireless power transmission system in this embodiment can operate in a high-frequency band such as ISM (Industry-Science-Medical) frequency band.

The power supply circuit 202 is a half-bridge type circuit that supplies AC power to the resonance circuit 204. As illustrated in FIG. 1, the power supply circuit 202 has a vertically symmetrical configuration. A coil La of the power supply circuit 202 and a coil Lb of the resonance circuit 204 constitute a coupling transformer T2. The coil La is a primary winding (transformer T2 primary coil) of the coupling transformer T2, and coil Lb is a secondary winding (transformer T2 secondary coil) of the coupling transformer T2. The number of windings of the primary winding of the coupling transformer T2 is larger than that of the secondary winding of the coupling transformer T2. Current Is flowing in the coil La is AC, and the direction of an arrow appearing near the current Is indicates the positive direction, and direction opposite to the direction of the arrow indicates the negative direction. When the AC current Is flows, AC current I1 flows in the resonance circuit 204.

The resonance circuit 204 is a circuit in which the secondary winding Lb of the coupling transformer T2, a coil Lc (first coil), the capacitor C2, a load R, and the capacitor C1 are connected in series. When the AC current I1 flows in the resonance circuit 204, power is supplied to the load R. When the frequency of the AC current I1 coincides with the resonance frequency of the resonance circuit 204, the maximum power is supplied to the load R. Assuming that the combined capacitance of the capacitors C1 and C2 is CP, the resonance frequency fr of the resonance circuit 204 is represented as the equation: $2\pi f \cdot Lc = 1/(2\pi f \cdot CP)$. Since the coil Lc is provided on the wireless power feeder 200 side, the wireless power receiver 300 can be reduced in weight and size. As described later, the coil Lc may be provided on the wireless power receiver 300 side.

Next, a configuration of the power supply circuit 202 will be described. An oscillator 210 is connected to the primary side of a gate drive transformer T1. The oscillator 210 functions as a "power transmission control circuit" that generates AC voltage at a drive frequency fo. Although the voltage waveform may be a sine wave, it is assumed here that the voltage waveform is a rectangular wave. The AC voltage causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

One end of the transformer T1 secondary coil Lf is connected to the gate of a switching transistor Q1, and the other end thereof is connected to the source of the switching transistor Q1. One end of the transformer T1 secondary coil Lg is connected to the gate of a switching transistor Q2, and the other end thereof is connected to the source of the switching transistor Q2. When the oscillator 210 generates AC voltage at the drive frequency fo, voltage Vx (Vx>0) is applied at the drive frequency fo alternately to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field Effect Transistor) having the same characteristics but may be other transistors such as a bipolar transistor. Further, other switches such as a relay switch may be used in place of the transistor.

The drain of the switching transistor Q1 is connected to the positive electrode of a power supply VDD1. The negative terminal of the power supply VDD1 is connected to the source of the switching transistor Q1 through the coil La on the primary side of the coupling transformer T2. The potential at the negative terminal of the power supply VDD1 is set to the ground potential. The source of the switching transistor Q2 is connected to the negative terminal of a power supply VDD2. The positive terminal of the power supply VDD2 is connected to the drain of the switching transistor Q2 through the coil La. The potential at the positive terminal of the power supply VDD2 is set to the ground potential.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") in this case starts from the power supply VDD1 through the switching transistor Q1 and coil La, and returns to the power supply VDD1. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") in this case starts from the power supply VDD2 through the feeding coil La and switching transistor Q2, and returns to the power supply VDD2. The switching transistor Q2 functions as a switch for controlling conduction/non-conduction of the second current path.

When the oscillator 210 supplies AC voltage at the resonance frequency fr, the first current path and second current path are alternately switched at the resonance frequency fr. Since the AC current IS of the resonance frequency fr flows in the coil La, the AC current I1 flows in the wireless power receiver 300 at the resonance frequency fr. At this time, a pair of the feeding electrode CS1 and receiving electrode CR1 and a pair of the feeding electrode CS2 and receiving electrode CR2 electrically resonate, with the result that the power transmission efficiency from the feeding electrodes CS1 and CS2 to the receiving electrodes CR1 and CR2 becomes maximum.

The resonance frequency fr slightly changes depending on use condition or use environment of the wireless power transmission system 100. Further, in the case where the capacitor C1, capacitor C2, or coil Lc are replaced with new one, the resonance frequency fr changes. Alternatively, there may be case where the resonance frequency fr needs to be changed aggressively by making the electrostatic capacitances of the capacitor C1 and capacitor C2 variable. Even in such a case, the wireless power transmission system 100 can make the drive frequency fo and resonance frequency fr to automatically coincide with each other.

In order to make the drive frequency fo to track the resonance frequency fr, the following configuration is added. Resistors R1 and R2 are connected to both ends of the oscillator 210. A connection point A between the resistors R1 and R2 is connected to the phase detection circuit 150 through the second waveform rectifier 144. The phase detection circuit 150 measures the voltage phase of the AC power supplied from the power supply circuit 200 based on the potential Vp1 at the connection point A according to the following method.

The AC voltage generated by the oscillator 210 is divided by the resistors R1 and R2, and the potential Vp1 is taken as the intermediate voltage of the AC voltage. Even in the case where the AC voltage generated by the oscillator 210 is large, the AC voltage can be reduced to a manageable level by the voltage division. In the case where the AC voltage generated by the oscillator 210 can be handled without modification, the voltage division need not be performed. The voltage phase may be measured from the source-drain voltages VDS1 and VDS2 or source-gate voltages VGS1 and VGS2.

A detection coil LSS is provided near the resonance circuit 204. The detection coil LSS is a coil wounded around a core 154 (toroidal core) having a penetration hole. The core 154 is formed of a known material such as ferrite, silicon steel, or permalloy. A part of the resonance circuit 204 penetrates the core 154. Inductive current ISS is made to flow in the detection coil LSS by an AC magnetic field generated by the AC current I1. The current I1 and inductive current ISS have the same phase.

A resistor R3 is connected to both ends of the detection coil LSS. One end B of the resistor R3 is grounded, and the other end C thereof is connected to the phase detection circuit 150 through the first waveform rectifier 142. The phase detection circuit 150 measures the current phase of the AC power that the transmission side resonance unit 206 supplies to the reception side resonance unit 208 based on the potential Vq1 at the connection point C according to the following method. The current I1 and inductive current ISS have the same phase, and the inductive current ISS and potential Vq1 have the same phase. Therefore, the current phase of the current I1 can be measured from the voltage phase of the potential Vq1. By comparing the voltage waveforms of the potential Vp1 and potential Vq1, the deviation between the voltage phase and current phase can be detected.

The potential Vq1 and potential Vp1 are digitized by the first waveform rectifier 142 and second waveform rectifier 144, respectively. Although details will be described later with regard to FIG. 7, the first waveform rectifier 142 is an amplifier that outputs a saturated voltage Vq2=5 (V) when the potential Vq1 exceeds a predetermined threshold, e.g., 0.1 (V). Thus, the potential Vq1 of an analog waveform is converted to the voltage Vq2 of a digital waveform by the first waveform rectifier 142. The first waveform rectifier 142 functions particularly effectively when the oscillator 210 generates the AC voltage not of a rectangular waveform but of an analog waveform such as a sine wave. Similarly, the second waveform rectifier 144 is an amplifier that outputs a saturated voltage Vp2=5 (V) when the potential Vp1 exceeds a predetermined threshold. The potential Vp1 of an analog wave form is converted to the voltage Vp2 of a digital waveform by the second waveform rectifier 144.

The phase detection circuit 150 compares the potential Vq2 and potential Vp2 to calculate the phase difference td between them. The phase detection circuit 150 changes control voltage Vt in accordance with the calculated phase difference td. The drive frequency tracking circuit 152 adjusts the drive frequency fo of the oscillator 210 in accordance with the control voltage Vt.

The drive frequency tracking circuit 152 and oscillator 210 may be integrated as a VCO (Voltage Controlled Oscillator). Further, an amplifier may be provided at the subsequent stage of the VCO so as to amplify the AC voltage to be supplied to the transformer T1 primary coil Lh.

Figure 2:
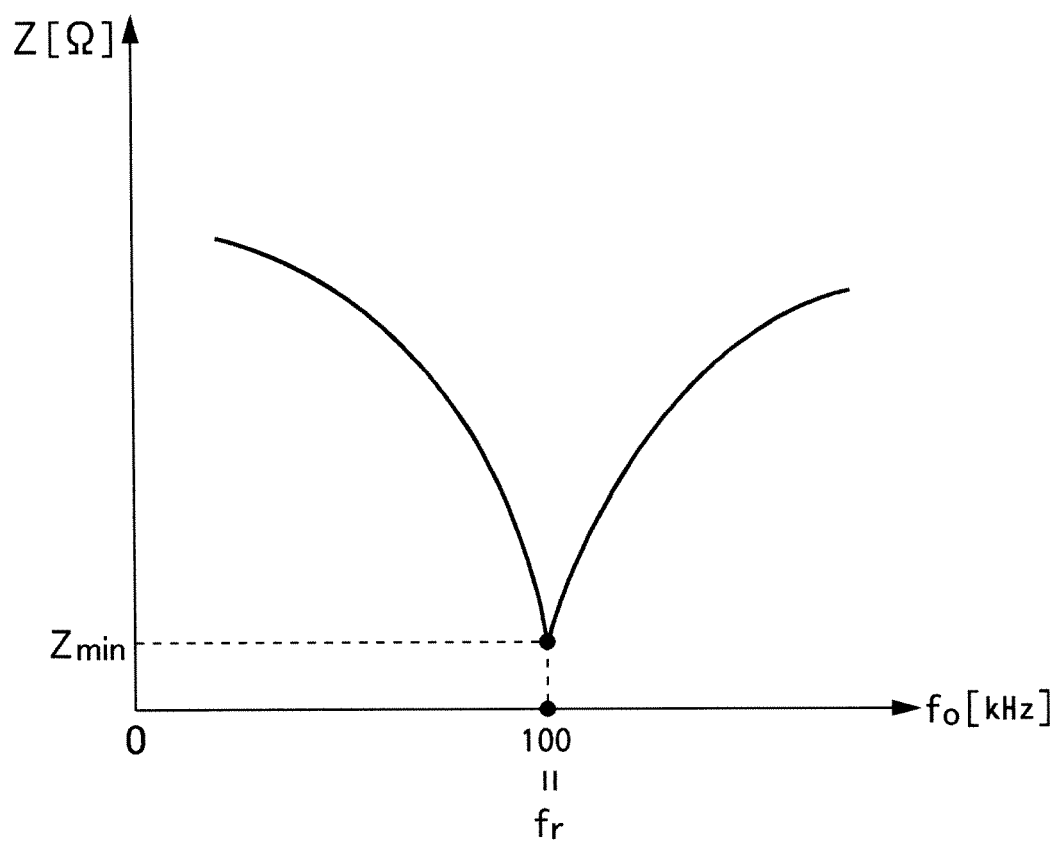
FIG. 2 is a graph illustrating the relationship between an impedance Z of a resonance circuit and a drive frequency fo.

FIG. 2 is a graph illustrating the relationship between an impedance Z of the resonance circuit 204 and drive frequency fo. The vertical axis represents the impedance Z of the capacitor C1, capacitor C2, and coil Lc in the resonance circuit 204. The horizontal axis represents the drive frequency fo. The impedance Z of the resonance circuit 204 becomes a minimum value Zmin at the resonance state.

In FIG. 2, the impedance Z becomes the minimum value when the drive frequency fo is 100 kHz, that is, when the drive frequency fo coincides with the resonance frequency fr, and the capacitor C1, capacitor C2, and coil Lc are made to resonate with each other. When the drive frequency fo and resonance frequency fr deviate from each other, the capacitive reactance or inductive reactance in the impedance Z prevails, so that the impedance Z increases.

When the drive frequency fo coincides with the resonance frequency fr, AC current I1 flows in the resonance circuit 204 at the resonance frequency fr. At this time, the power transmission efficiency from the feeding electrodes CS1 and CS2 to receiving electrodes CR1 and CR2 becomes maximum.

When the drive frequency fo and resonance frequency fr deviate from each other, AC current I1 of a non-resonance frequency flows in the resonance circuit 204. Thus, the resonance circuit 204 does not resonate, resulting in rapid degradation of power transmission efficiency.

Figure 3:
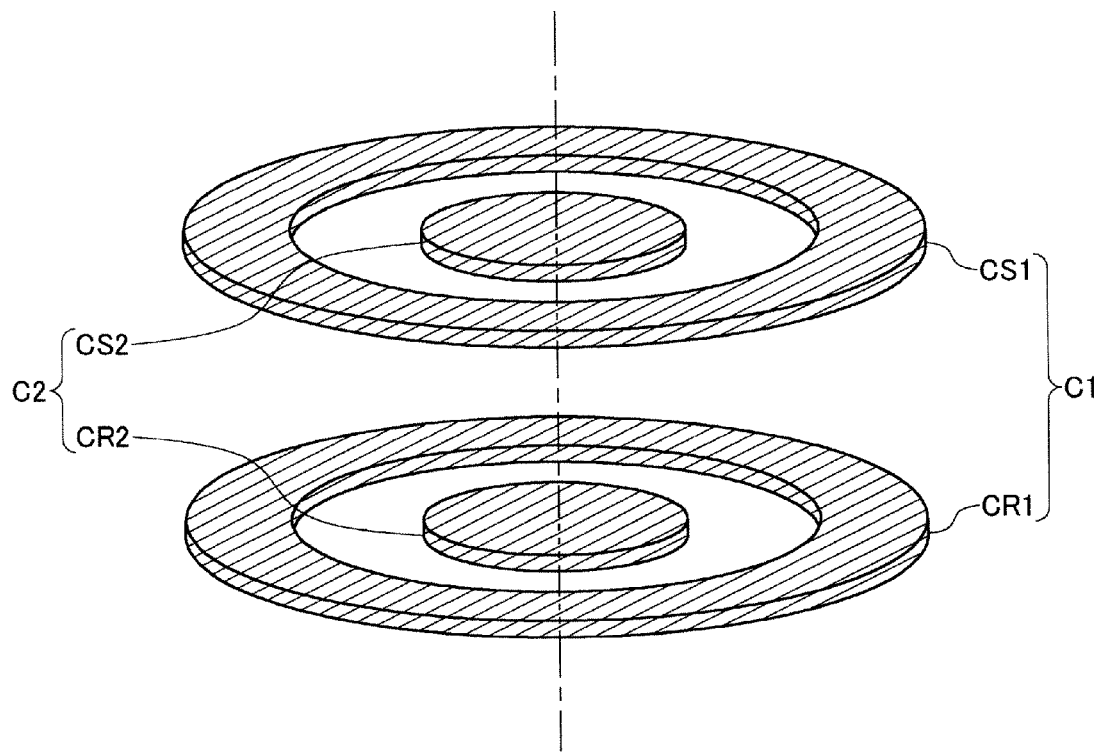
FIG. 3 is a view illustrating outer appearances of the capacitors C1 and C2.

FIG. 3 illustrates outer appearances of the capacitors C1 and C2. The capacitors C1 and C2 are each constituted by two opposite electrodes. When the opposing area of the capacitors C1 and C2 changes, the electrostatic capacitance also changes. When the electrostatic capacitances of the capacitors C1 and C2 changes, the resonance frequency fr changes.

In the present embodiment, the feeding electrode CS1 and receiving electrode CR1 constituting the capacitor C1 each have an annular shape. The feeding electrode CS2 and receiving electrode CR2 constituting the capacitor C2 each have a disc shape. Conversely, the capacitors C2 and C1 may have an annular shape and a disc shape, respectively. By forming the respective electrodes into a circular form, the opposing area does not entirely change even if the electrodes change in the rotational position. Therefore, the electrostatic capacitances of the capacitors C1 and C2 and eventually the resonance frequency fr can easily be made stable.

The feeding electrode CS1 of the capacitor C1 and feeding electrode CS2 of the capacitor C2 are formed on the same plane, and the feeding electrode CS2 is disposed inside the feeding electrode CS1. Similarly, the receiving electrode CR1 of the capacitor C1 and receiving electrode CR2 of the capacitor C2 are formed on the same plane, and the receiving electrode CR2 is disposed inside the receiving electrode CR1. As described above, the capacitor C2 is placed inside the capacitor C1, so that the resonance circuit 204 can be made compact.

Figure 4:
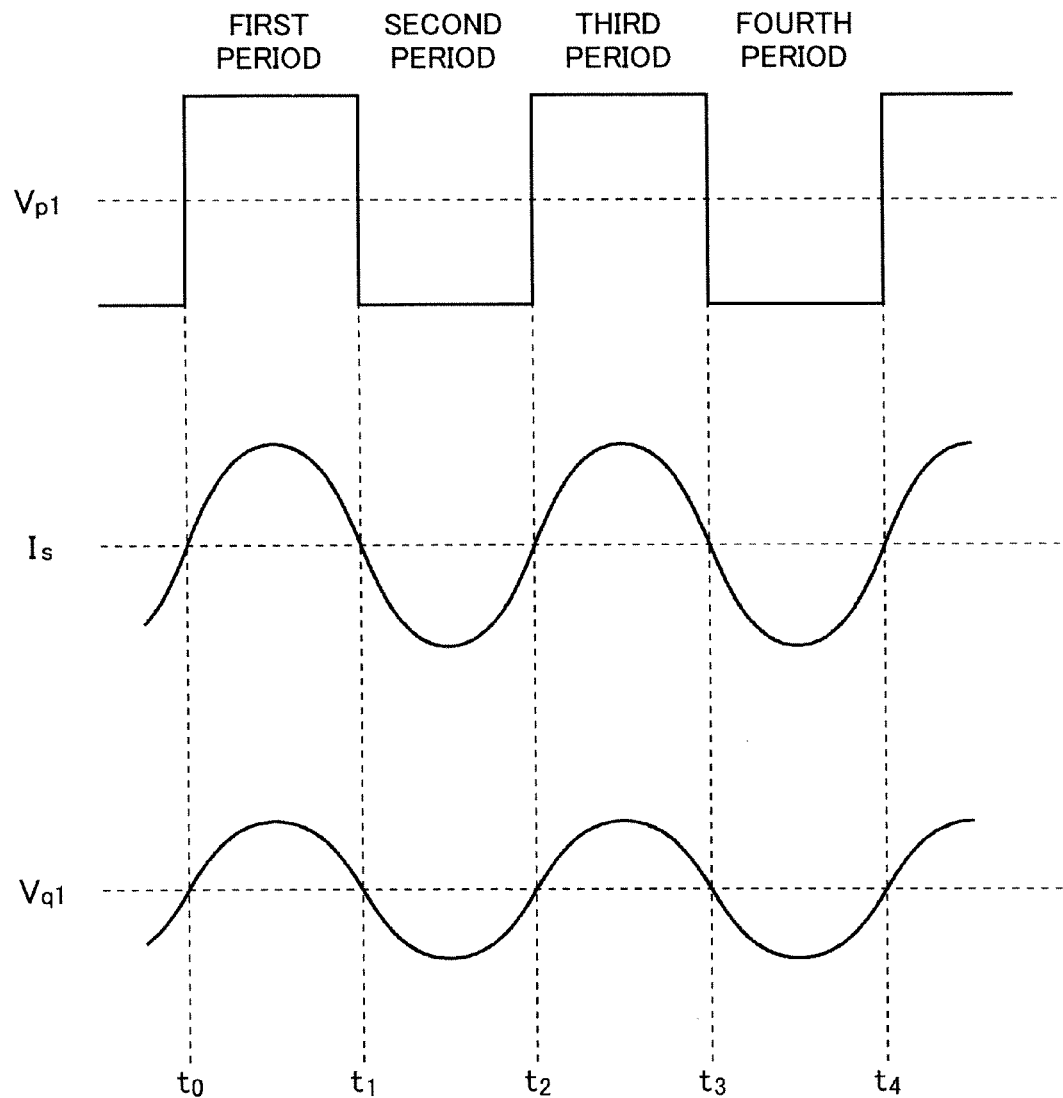
FIG. 4 is a time chart illustrating changing processes of the voltage and current when the drive frequency fo and resonance frequency fr coincide with each other.

FIG. 4 is a time chart illustrating changing processes of the voltage and current when the drive frequency fo and resonance frequency fr coincide with each other. Time period from time t0 to time t1 (hereinafter, referred to as "first time period") is a time period during which the switching transistor Q1 is ON while the switching transistor Q2 is OFF. Time period from time t1 to time t2 (hereinafter, referred to as "second time period") is a time period during which the switching transistor Q1 is OFF while the switching transistor Q2 is ON. Time period from time t2 to time t3 (hereinafter, referred to as "third time period") is a time period during which the switching transistor Q1 is ON while the switching transistor Q2 is OFF. Time period from time t3 to time t4 (hereinafter, referred to as "fourth time period") is a time period during which the switching transistor Q1 is OFF while the switching transistor Q2 is ON.

When the gate-source voltage VGS1 of the switching transistor Q1 exceeds a predetermined threshold Vx, the switching transistor Q1 is in a saturated state. Thus, when the switching transistor Q1 is turned ON (conductive) at time t0 which is the start timing of the first time period, source-drain current IDSL starts flowing. In other words, the current IS starts flowing in the positive direction (first current path).

When the switching transistor Q1 is turned OFF (non-conductive) at time t1 which is the start timing of the second time period, the source-drain current IDS1 does not flow. Instead, the switching transistor Q2 is turned ON (conductive), source-drain current IDS2 starts flowing. That is, the current IS starts flowing in the negative direction (second current path).

The current IS, current I1, and inductive current ISS have the same phase, and potential Vq1 and inductive current ISS have the same phase. Therefore, the current waveform of the current IS and voltage waveform of the potential Vq1 synchronize with each other. By observing the voltage waveform of the potential Vq1, the current phase of the current IS (source-drain currents IDS1 and IDS2) can be measured. In the third, fourth and subsequent time periods, the same waveform as in the first and second time periods repeats.

Figure 5:
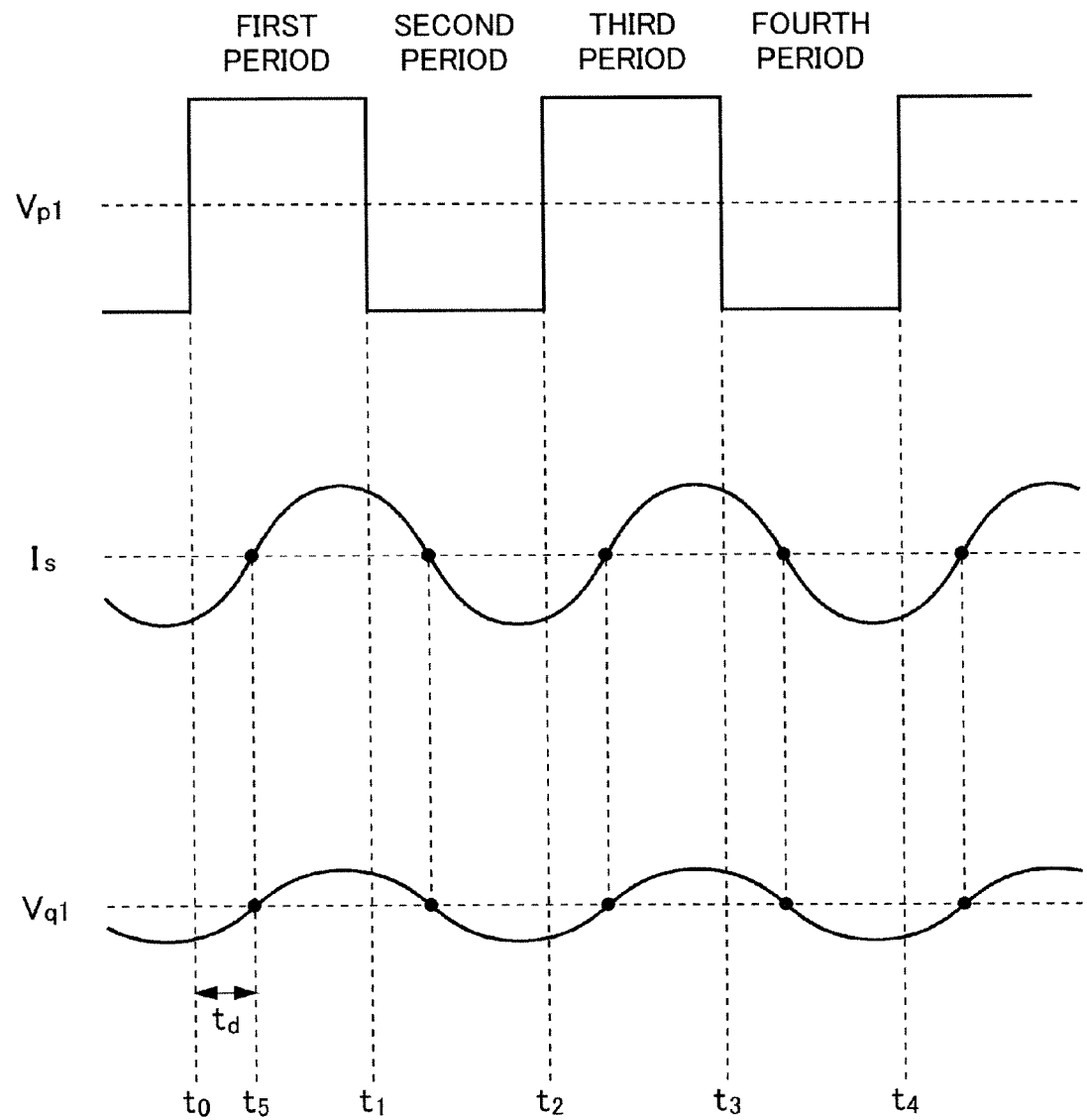
FIG. 5 is a time chart illustrating changing processes of the voltage and current when the drive frequency fo is higher than the resonance frequency fr.

FIG. 5 is a time chart illustrating changing processes of the voltage and current when the drive frequency fo is higher than the resonance frequency fr. In the case where the drive frequency fo is higher than the resonance frequency fr, an inductive reactance component appears in the impedance Z of the resonance circuit 204, and the current phase of the AC current IS delays with respect to the voltage phase. As described above, the current IS and potential Vq1 have the same phase, so that by comparing the voltage waveforms of the potential Vp1 and potential Vq1, the phase difference td between the current phase and voltage phase in the supplied power can be detected.

As illustrated in FIG. 4, when the drive frequency fo and resonance frequency fr coincide with each other, the current IS starts flowing at time t0 which is the start timing of the first time period, and potential Vq1 becomes higher than zero. In this case, the phase difference td is zero. When the drive frequency fo is higher than the resonance frequency fr, the current IS starts flowing at time t5 which is later than time t0, and Vq1 becomes higher than zero at t5, so that the phase difference td (=t0−t5) becomes less than zero. When the drive frequency fo and resonance frequency fr deviate from each other, the output power efficiency is degraded, so that the amplitudes of the current IS and potential Vq1 become smaller than those at the resonance state.

Figure 6:
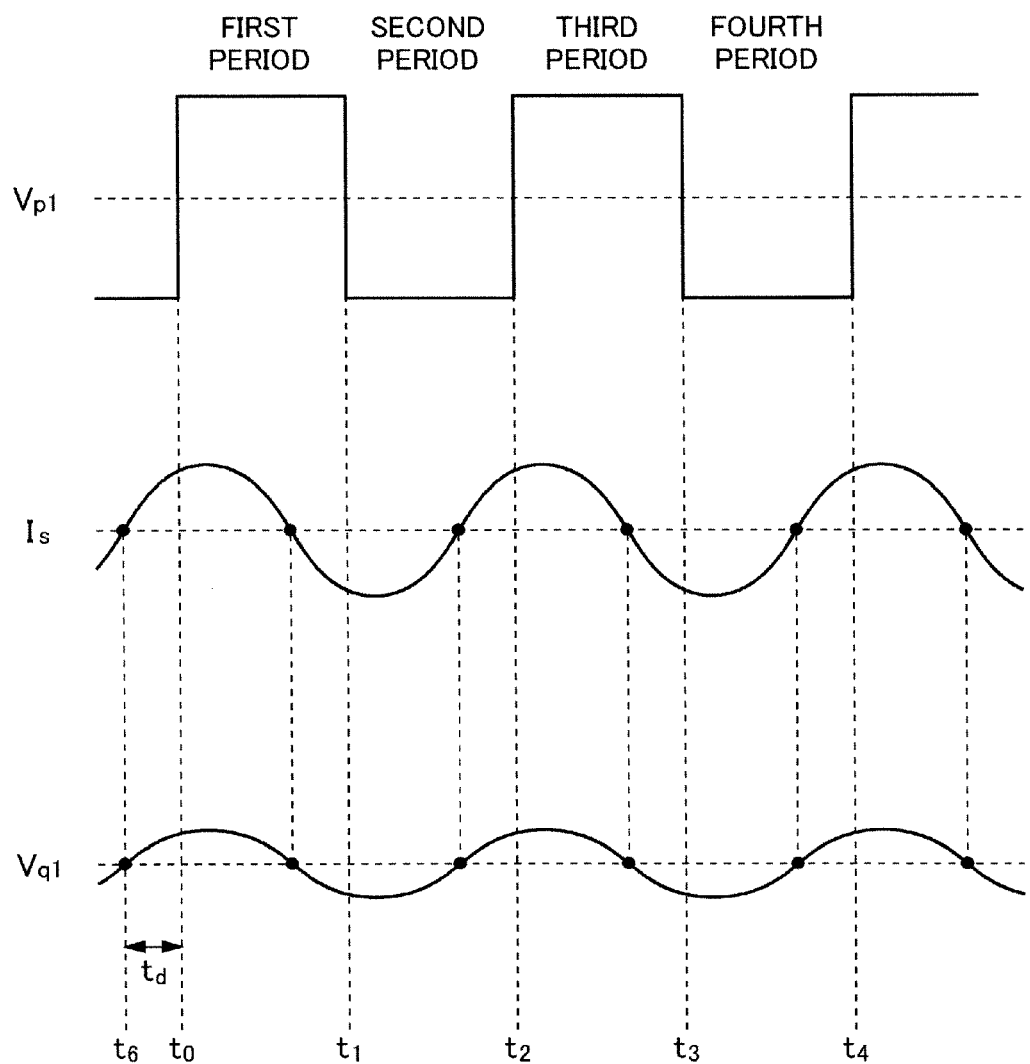
FIG. 6 is a time chart illustrating changing process of the voltage and current when the drive frequency fo is lower than the resonance frequency fr.

FIG. 6 is a time chart illustrating changing process of the voltage and current when the drive frequency fo is lower than the resonance frequency fr. In the case where the drive frequency fo is lower than the resonance frequency fr, a capacitive reactance component appears in the impedance Z, and the current phase of the current IS advances with respect to the voltage phase. Thus, the current IS starts flowing at time t6 which is earlier than time t0. In this case, the phase difference td (=t0−t6) is more than zero. The amplitudes of the current IS and potential Vq1 become smaller than those at the resonance state.

Figure 7:
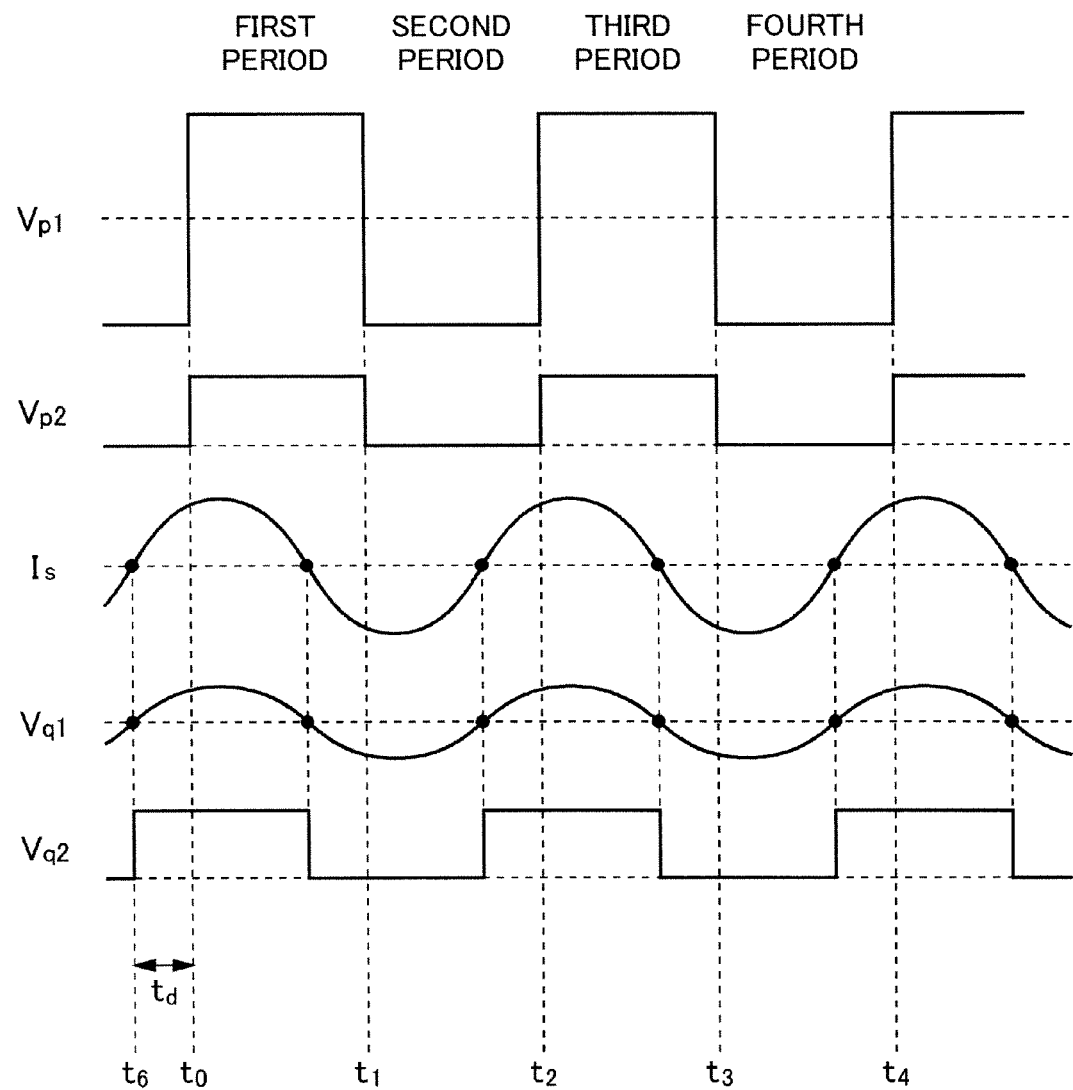
FIG. 7 is a time chart illustrating changing processes of various voltages input to a phase detection circuit.

FIG. 7 is a time chart illustrating changing processes of various voltages input to the phase detection circuit 150. The potential Vp1 changes in synchronization with the AC voltage of the oscillator 210. The potential Vp1 is more than zero in the first and third time periods. The first waveform rectifier 142 is an amplifier that outputs a saturated voltage of 5 (V) when the potential Vq1 exceeds a predetermined threshold, e.g., 0.1 (V). Thus, even in the case where the potential Vq1 assumes an analog waveform, the first waveform rectifier 142 can generate the voltage Vq2 of a digital waveform.

The potential Vq1 changes in synchronization with the current IS and current I1. FIG. 7 illustrates a waveform observed in the case where the drive frequency fo is lower than the resonance frequency fr. Thus, the current phase advances with respect to the voltage phase. The second waveform rectifier 144 amplifies the potential Vp1 of an analog waveform to thereby generate the voltage Vp2 of a digital waveform.

The phase detection circuit 150 compares rising edge time t0 of the voltage Vp2 and rising edge time t6 of the voltage Vq2 to calculate (t0−t6) the phase difference td. The first waveform rectifier 142 and second waveform rectifier 144 convert (shape) the waveforms of the potential Vq1 and potential Vp1 into digital waveforms, respectively, to make it easy for the phase detection circuit 150 to detect the phase difference td. As a matter of course, the phase detection circuit 150 may directly compare the potential Vq1 and potential Vp1 for detection of the phase difference td.

In the wireless power transmission system 100, the AC magnetic field generated by the resonance circuit 204 is utilized to cause the detection coil LSS to generate the inductive current ISS to thereby measure the current phase. Thus, it is possible to measure the current phase while suppressing measurement load on the resonance circuit 204.

Figure 8:
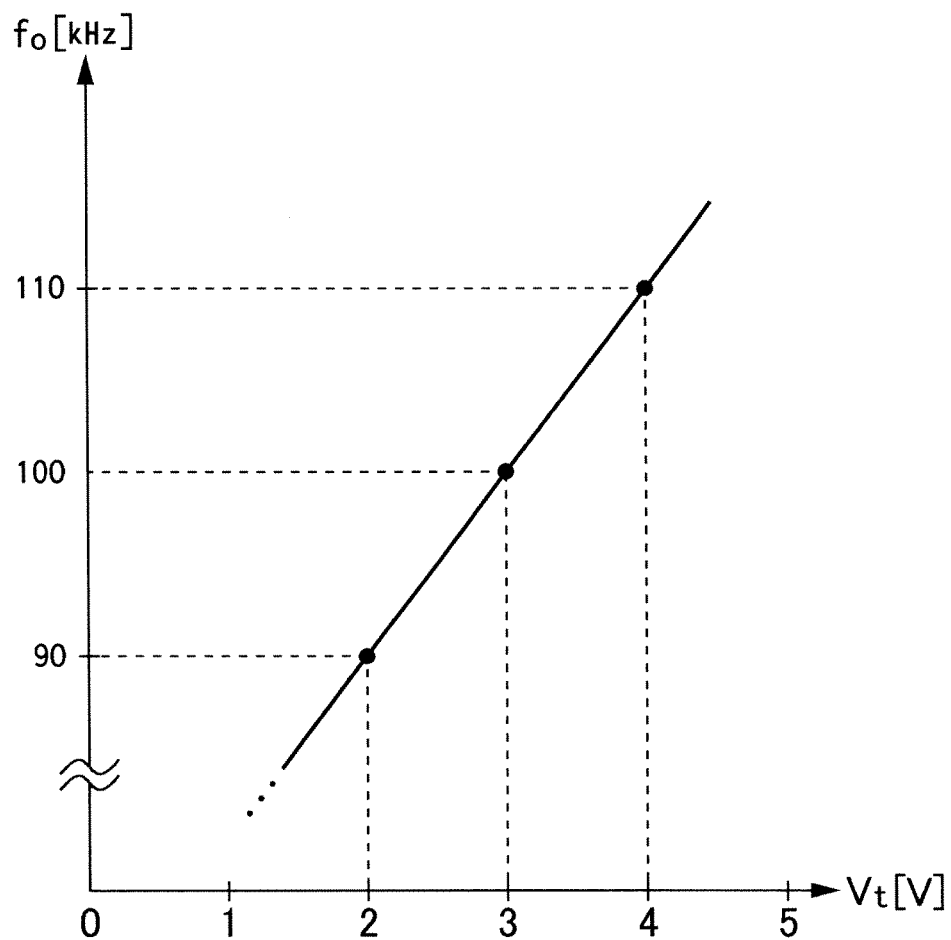
FIG. 8 is a graph illustrating the relationship between control voltage Vt and drive frequency fo.

FIG. 8 is a graph illustrating the relationship between the control voltage Vt and drive frequency fo. The relationship of FIG. 8 is set in the drive frequency tracking circuit 152. The magnitude of the phase difference td is proportional to the variation of the resonance frequency fr. Thus, the phase detection circuit 150 determines the variation of the control voltage Vt in accordance with the phase difference td, and the drive frequency tracking circuit 152 determines the drive frequency fo in accordance with the control voltage Vt.

The resonance frequency fr is 100 kHz in the initial state and, accordingly, the drive frequency fo is set to 100 kHz. The control voltage Vt is initially set to 3 (V). Here, it is assumed that the resonance frequency fr changes from 100 kHz to 90 kHz. Since the drive frequency fo (=100 kHz) is higher than the resonance frequency fr (=90 kHz) in this state, the phase difference td is less than zero. The phase difference td is proportional to the variation (−10 kHz) of the resonance frequency fr. The phase detection circuit 150 determines the variation of the control voltage Vt based on the phase difference td. In this example, the phase detection circuit 150 sets the variation of the control voltage Vt to −1 (V) and outputs new control voltage Vt=2 (V). The drive frequency tracking circuit 152 outputs the drive frequency fo=90 kHz corresponding to the control voltage Vt=2 (V) according to the relationship represented by the graph of FIG. 8. With the above processing, it is possible to allow the drive frequency fo to automatically track a change of the resonance frequency fr.

The phase detection circuit 150, the drive frequency tracking circuit 152, and oscillator 210 may be implemented as one chip. The processing of the phase detection circuit 150 or drive frequency tracking circuit 152 may be performed by software. For example, setting information in which the phase difference td and variation of the drive frequency fo has been previously associated may be retained. In this case, the drive frequency fo is adjusted in accordance with the magnitude of the detected phase difference td.

Figure 9:
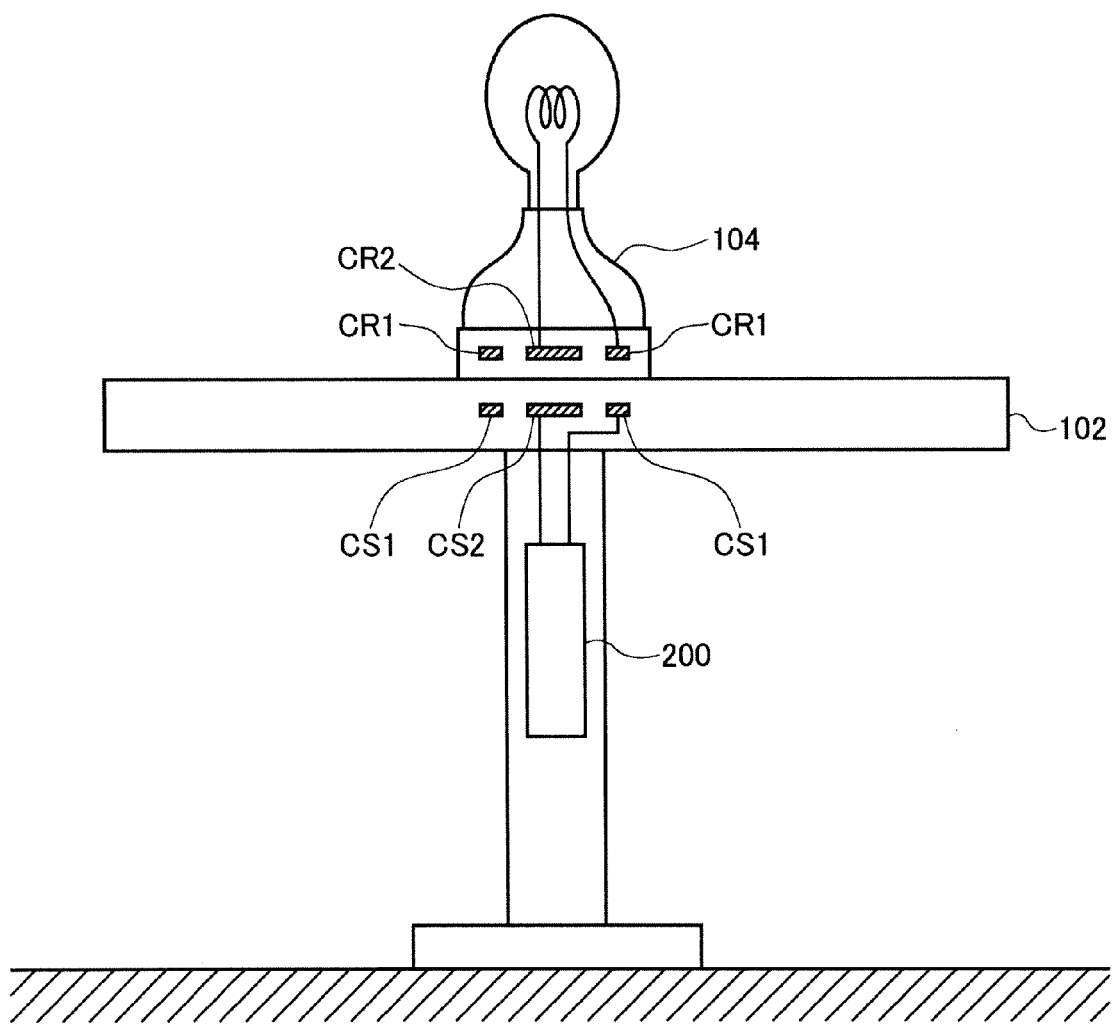
FIG. 9 is a side view of a table and a table lamp realized by using the wireless power transmission system.

FIG. 9 is a side view of a table 102 and a table lamp 104 realized by using the wireless power transmission system 100. The table 102 incorporates the function of the wireless power feeder 200. The wireless power feeder 200 may be installed on the rear side of the table plate as a whole or housed inside the table plate.

The feeding electrodes CS1 and CS2 receive AC power from the wireless power feeder 200. The table lamp 104 incorporates the function of the wireless power receiver 300. The table lamp 104 includes the receiving electrodes CR1 and CR2. When the table lamp 104 is placed on the table 102 such that the feeding electrodes CS1 and CS2 of the table 102 face the receiving electrodes CR1 and CR2, power is fed from the feeding electrodes CS1 and CS2 of the table 102 to the receiving electrodes CR1 and CR2 by wireless. The lamp corresponds to the load R of FIG. 1. This lamp may turn on by receiving AC current. Further, AC current I1 flowing in the resonance circuit 204 may be converted into DC current by a not illustrated rectification circuit for supply to the lamp.

Figure 10:
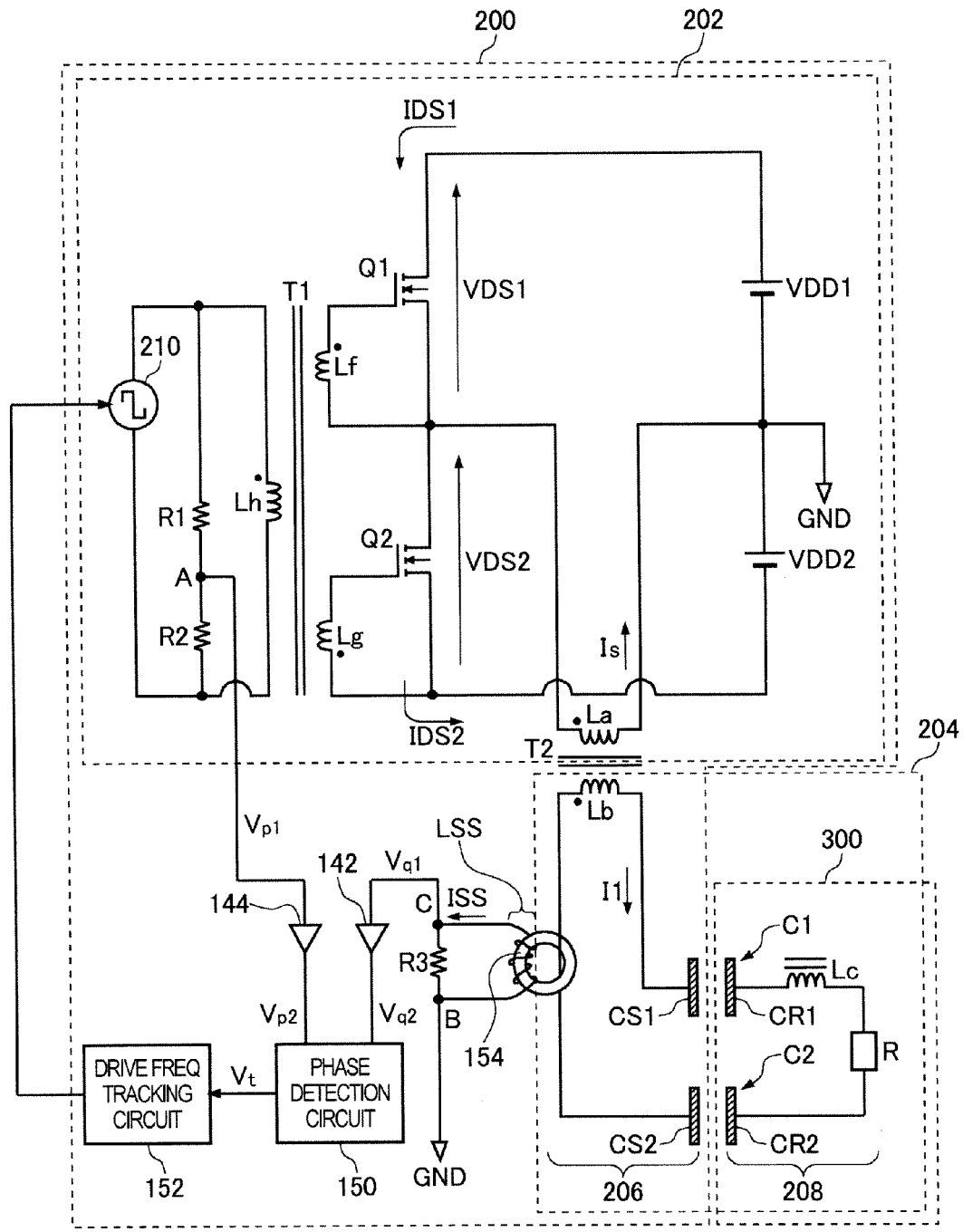
FIG. 10 is a view illustrating a first modification of the system configuration of the wireless power transmission system.

FIG. 10 is a view illustrating a first modification of the system configuration of the wireless power transmission system 100. It is only necessary for the coil Lc to constitute a part of the resonance circuit 204. As illustrated in FIG. 10, the coil Lc may be provided not on the transmission side resonance unit 206 but on the reception side resonance unit 208. In this case, when a plurality of wireless power receivers 300 are provided, the resonance frequency fr of the resonance circuit 204 can be adjusted for each wireless power receiver 300.

Figure 11:
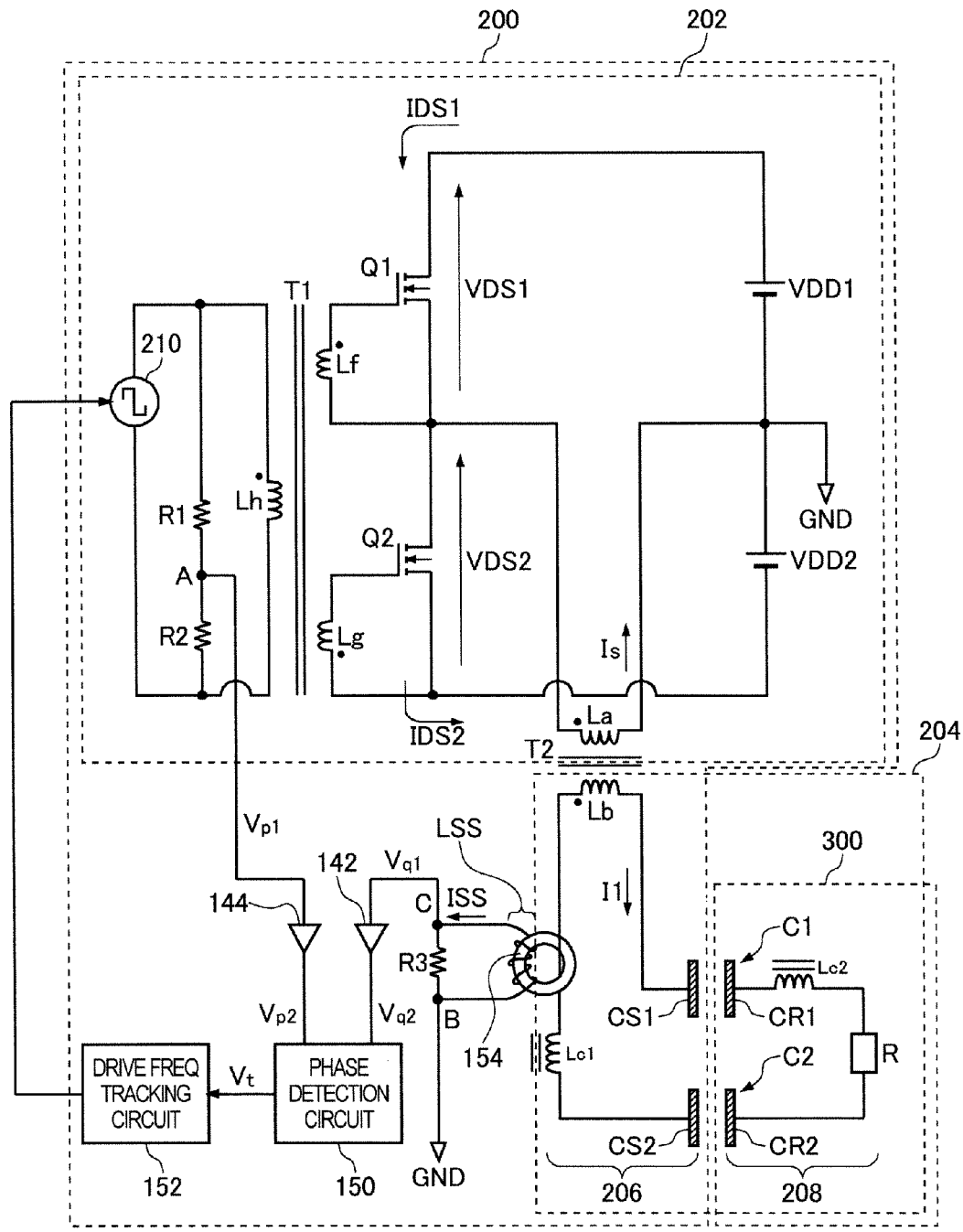
FIG. 11 is a view illustrating a second modification of the system configuration of the wireless power transmission system.

FIG. 11 is a view illustrating a second modification of the system configuration of the wireless power transmission system 100. As illustrated in FIG. 11, a coil Lc1 and a coil Lc2 are provided in the transmission side resonance unit 206 and reception side resonance unit 208, respectively (Lc=Lc1+Lc2). Also in this case, when a plurality of wireless power receivers 300 are provided, the resonance frequency fr can be adjusted for each wireless power receiver 300. In addition, the coil Lc2 can be reduced in weight and size more than in the case of the coil Lc of the first modification.

The present invention has been described based on the above embodiment. It should be understood by those skilled in the art that the above embodiment is merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

For example, power may be supplied from the power supply circuit 202 to the resonance circuit 204 without intervention of the coupling transformer T2. In this case, the entire or a part of the coil Lc may be provided on the power supply circuit 202 side.

What is claimed is:

1. A wireless power feeder comprising:
a power transmission side resonance unit that constitutes a part of a resonance circuit constituted by connecting a first capacitor, a second capacitor, a first coil, and a load and includes one of two electrodes constituting the first capacitor and one of two electrodes constituting the second capacitor;
a first switch that controls supply of current to the power transmission side resonance unit in a first direction;
a second switch that controls supply of current to the power transmission side resonance unit in a second direction;
a power transmission control circuit that alternately turns the first and second switches conductive to make the first capacitor, second capacitor, and the first coil included in the resonance circuit resonate so as to allow the first and second capacitors to each feed AC power from the one electrode to the other electrode;
a second coil that generates inductive current; and
a phase detection circuit that detects a phase difference between voltage and current phases of the AC power, wherein
a path of current flowing in the first and second switches and a path of current flowing in the transmission side resonance unit are separated by a coupling transformer, and AC current is supplied to the transmission side resonance unit via the coupling transformer,
the second coil is wound around a core and generates the inductive current using a magnetic field which is generated when the AC current supplied to the transmission side resonance unit via the coupling transformer passes through the core,
the phase detection circuit detects the current phase of the AC power based on the phase of the inductive current flowing in the second coil,
the first and second capacitors are each constituted by opposite circular electrodes,
one of the first and second capacitors is constituted by opposite disc-shaped electrodes, and
the other capacitor is constituted by opposite annular-shaped electrodes.

2. The wireless power feeder according to claim 1, further comprising a drive frequency tracking circuit that adjusts the drive frequency of the power transmission control circuit so as to reduce the detected phase difference to allow the drive frequency to track the resonance frequency.

3. The wireless power feeder according to claim 1, wherein
a resistor is connected to both ends of the second coil in parallel with respect to the second coil, and
the phase detection circuit measures the current phase from a change in the voltage applied to the resistor.

4. The wireless power feeder according to claim 1, further comprising:
a first waveform rectifier that shapes an analog waveform having the same phase as that of a current waveform of the AC power into a digital waveform; and
a second waveform rectifier that shapes an analog waveform having the same phase as that of a voltage waveform of the AC power into a digital waveform, wherein
the phase detection circuit compares the edges of two digital waveforms to detect the phase difference.

5. The wireless power feeder according to claim 1, wherein
the disc-shaped electrode is disposed on the same plane as the annular-shaped electrode and disposed inside the annular-shaped electrode.

6. A wireless power transmission system comprising:
a resonance circuit constituted by connecting a first capacitor, a second capacitor, a first coil, and a load;
a first switch that controls supply of current to the resonance circuit in a first direction;
a second switch that controls supply of current to the resonance circuit in a second direction;
a power transmission control circuit that alternately turns the first and second switches conductive to make the first capacitor, second capacitor, and the first coil included in the resonance circuit resonate so as to allow the first and second capacitors to each feed AC power from the one electrode to the other electrode;
a second coil that generates inductive current; and
a phase detection circuit that detects a phase difference between voltage and current phases of the AC power, wherein
a path of current flowing in the first and second switches and a path of current flowing in the resonance circuit are separated by a coupling transformer, and AC current is supplied to the resonance circuit via the coupling transformer,
the second coil is wound around a core and generates the inductive current using a magnetic field which is generated when the AC current supplied to the resonance circuit via the coupling transformer passes through the core,
the phase detection circuit detects the current phase of the AC power based on the phase of the inductive current flowing in the second coil,
the first and second capacitors are each constituted by opposite circular electrodes,
one of the first and second capacitors is constituted by opposite disc-shaped electrodes, and
the other one is constituted by opposite annular-shaped electrodes.

* * * * *